United States Patent [19]

Signoretto

[11] Patent Number: 4,881,090

[45] Date of Patent: Nov. 14, 1989

[54] METHOD AND APPARATUS FOR IDENTIFYING NEGATIVES IN PHOTOGRAPHIC LABORATORIES

[75] Inventor: Roberto Signoretto, Venice, Italy

[73] Assignee: Photo Engineering S.R.L., Venice, Italy

[21] Appl. No.: 243,631

[22] Filed: Sep. 13, 1988

[30] Foreign Application Priority Data

Sep. 25, 1987 [IT] Italy .............................. 84159 A/87

[51] Int. Cl.[4] .............................................. G03B 17/24

[52] U.S. Cl. ...................................... 354/105; 355/40; 355/77; 355/50

[58] Field of Search ................................ 354/105-109; 355/40, 50, 64, 77, 132, 41, 35, 38, 68

[56] References Cited

U.S. PATENT DOCUMENTS

| | | | |
|---|---|---|---|
| 4,294,537 | 10/1981 | Laska et al. | 355/64 X |
| 4,574,692 | 3/1986 | Wahli | 354/105 X |
| 4,716,711 | 1/1988 | Sigmoretto | 53/460 |
| 4,779,122 | 10/1988 | Signoretto | 355/40 X |
| 4,800,406 | 1/1989 | Signoretto | 355/77 X |

*Primary Examiner*—L. T. Hix
*Assistant Examiner*—Brian W. Brown
*Attorney, Agent, or Firm*—Hoffman, Wasson, Fallow & Gitler

[57] ABSTRACT

A method and apparatus for identifying negatives in photographic laboratories, characterized in that in the finishing station (1), after a tab (5) has been applied to the continuous strip of negatives (7) but before inserting the tabbed strip cut into portions into its envelope, order identification data are printed on the tab in synchronism with the cutting operation.

17 Claims, 1 Drawing Sheet

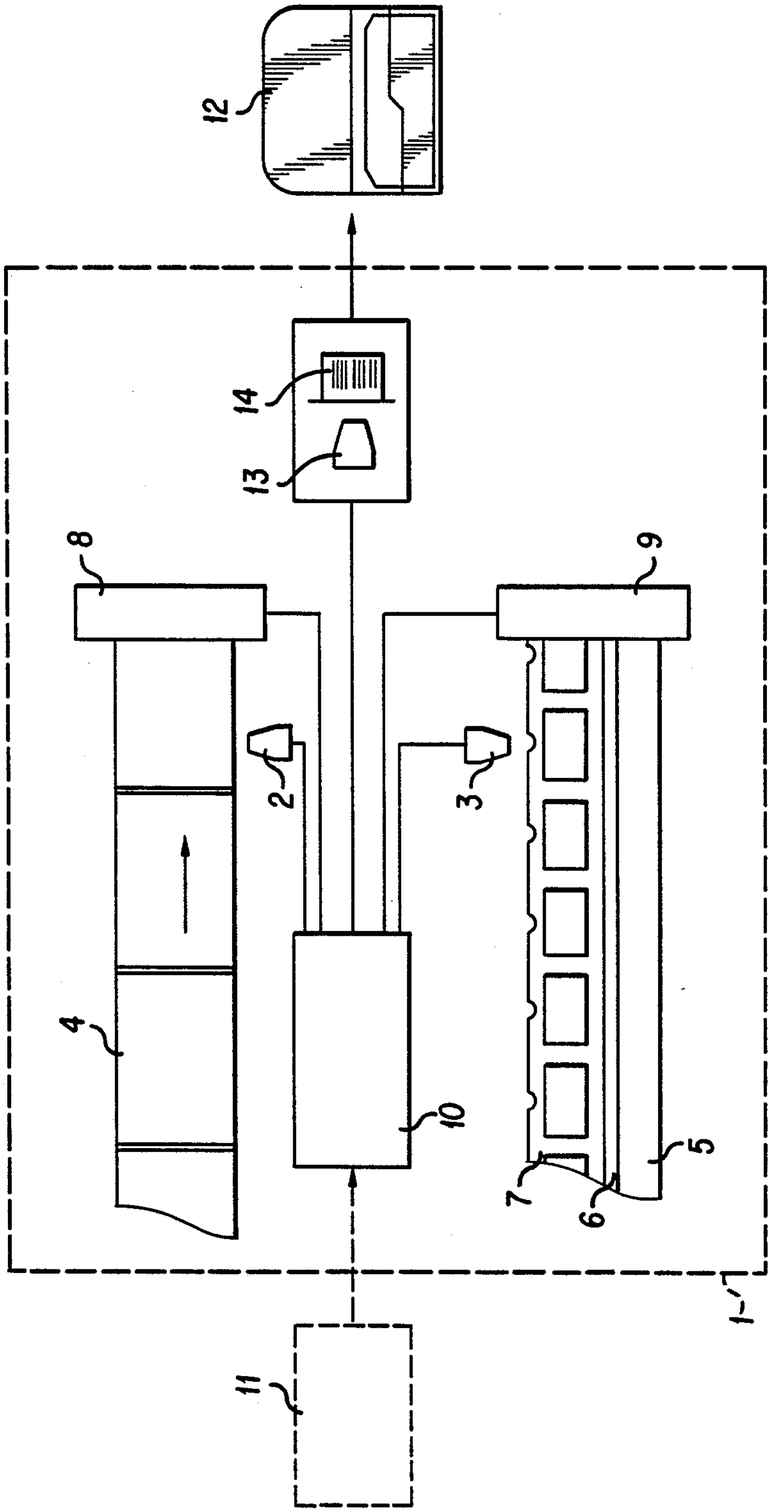
12
14
13
8
9
2
3
4
10
5
7
6
1
11

METHOD AND APPARATUS FOR IDENTIFYING NEGATIVES IN PHOTOGRAPHIC LABORATORIES

This invention relates to a method for identifying negatives in photographic laboratories, in particular in photographic laboratories which develop and print negatives for final customers. The invention also relates to a machine for implementing the invention.

In the photographic field, in addition to laboratories which operate on behalf of photographic shops, i.e., which receive orders from shops on behalf of the shop customers, there are also photographic laboratories which receive orders directly from final customers and return the developed negatives and prints to them after the usual processing. In practice, the films from the various customers for development reach such laboratories in the laboratory's own envelopes, and are extracted, joined together, developed and printed. After printing the continuous strip of negatives and the continuous strip of prints are fed to the finishing station, where the negatives corresponding to the various orders are separated from the continuous strip and cut into portions, while the corresponding prints are cut individually from their continuous strip and are placed together with the portions of negatives in the envelope for return to the customer.

In the finishing station it is also known to apply to the continuous film strip, before it is cut into portions, a paper tab which receives all the information required by the the laboratory for a possible reorder. More specifically, when reordering, the customer writes on this tab which accompanies each portion of negative all the reprinting information required by the laboratory, i.e. number of copies, format etc., for each frame to be reprinted.

This procedure has however resulted and still results in difficulties both for the photographic laboratory and for the customer. With regard to the photographic laboratory, should for any reason a film portion with is tab fall onto the floor or leave the normal operating cycle, it becomes practically impossible to relate it to the customer from whom it has originated, particularly because of the high customer density of this type of laboratory.

With regard to the customer it is obviously difficult on reordering to identify the exact negative to be reprinted, and this difficulty increases with time because of the natural disinclination of the customer to preserve negatives with the same degres of care and classification as reserved for prints.

An object of the invention is to overcome these problems encountered by the photographic laboratory and final customer, by on the one hand making it impossible to lose the connection between one negative portion and the other portions comprising the same order, and on the other hand facilitating precise customer identification of the negatives to be reprinted.

This and further objects which will be apparent from the description given hereinafter are attained according to the invention by a method for identifying negatives in photographic laboratories, characterised in that in the finishing station, after a tab has been applied to the continuous strip of negatives but before inserting the tabbed strip cut into portions into its envelope, order identification data are printed on the tab in synchronism with the cutting operation.

Further according to the invention, marking signals can be generated in the printing station in correspondence only with those negatives which are actually printed, for feeding to the finishing station in order to be reproduced on the tab in correspondence with the printed frames, and on the corresponding prints.

This method is implemented according to the invention by providing in the finishing station a printer for reproducing frame identification data on the tab previously applied to said strip, said printer being controlled by a microprocessor to which the printing station is also connected.

A preferred embodiment of the present invention is described hereinafter with reference to the accompanying drawing which schematically illustrates the method of the invention.

As can be seen from the drawing, the method of the invention comprises the use in the finishing station 1 of two printers 2 and 3 preferably of the dot matrix type, acting respectively on the rear of the print strip 4 and on the tab 5 which has in the meantime been applied by adhesive tape 6 to the continuous negative strip 7.

The two printers 2, 3 are disposed immediately upstream of the respective cutters 8, 9 which cut the strip 4 into individual prints and the strip 7 into portions and which are connected for their operation to a microprocessor 10 which besides synchronising the various operations also transmits to the two printers 2, 3 the data received from the printing station 11 for identifying only the frames actually printed.

In practice, the microprocessor 10 receives the information generated in the printing station 11 regarding the printed negatives (i.e. the negatives which have not been excluded from printing for any reason) and uses it to cause the printer to reproduce this information on the tab 5 in positions corresponding with the printed frames, and causes the printer 2 to reproduce it on the back of the corresponding prints.

In order to identify each frame of the strip 7 and relate it to the corresponding print of the strip, 4 it is preferable that the information reproduced by the two printers 2, 3 on the prints 4 and on the tab 5 includes details of the treatment by the photographic laboratory, customer identification data, order number and finally a progressive print numbering and thus a progressive numbering of those negatives printed.

After the strip 7 has been cut into portions by the cutter 9, each portion carries on its length of tab 5 the order data reproduced once only, and progressive numbers reproduced in positions corresponding only frames actually printed, each number corresponding to a print.

The present description has omitted all information regarding the identification of those negatives which have actually been printed and the method of obtaining synchronism between the feeding of the strips of negatives 7 and prints 4 and the operation of the respective cutters 9 and 8, as this constitutes the known art available to the expert.

From the foregoing it is apparent that the method according to the invention provides important advantages in the processing of photographic material in computerised laboratories, and in particular:

it enables each negative portion to be provided with information which properly identify its origin, this being done before the portion has been separated from the strip 7 and therefore before it loses its connection with its previous origin-identification data, it allows immediate visual correlation between the negative to be reprinted and the corresponding print, and thus allows each negative to be quickly and correctly identified from its print.

the aforesaid advantages are obtained using the actual tab conventionally provided for other purposes, so that the customer is offered a series of supplementary attributes without having to take any additional action.

In order to facilitate retrieval of the negatives to be reprinted, order identification data corresponding to that reproduced on the tab 5 and on the back of the prints 4 can also be reproduced on the outside of the conventional envelope 12 in which the negative portions and prints are placed for return to the original customer. This can be done using a supplementary printer 13 controlled by the microprocessor 10 and printing either directly on the wallets 12 of the various orders or on a roll of self-adhesive labels 14 which are automatically applied to the finishing station 1 to the envelopes 12 by known methods.

I claim:

1. A method of correlating negatives and order envelopes in a finishing station of a photographic laboratory, comprising steps of passing a continuous web of negatives into said finishing station, affixing a continuous web along one edge of said web, cutting said web into strips, each strip remaining attached to a corresponding length of said tab, marking order identification data on said tab in synchronization with the cutting step, and inserting each of said strips pertaining to a particular order into an envelope for that order.

2. The invention of claim 1, wherein the tab is imprinted prior to the cutting step.

3. The invention of claim 1, wherein said laboratory includes a photographic printing station upstream of said finishing station, and said method comprising a further step of generating signals in a printing station, in correspondence only with those negatives actually printed, and feeding said signals to the finishing station for controlling the marking step so as to mark the tab in positions corresponding with the actually printed frames, and also on prints corresponding to said frames.

4. The invention of claim 1, wherein, during the marking step, frame identification data is printed on the tab in addition to the order identification data.

5. The invention of claim 3, wherein said identification data is marked on the back of each print, corresponding to the data printed on said tab.

6. The invention of claim 3, wherein the data printed on tab is progressive numbering.

7. The invention of claim 1, comprising a further step of marking said order identification data onto the envelope into which said prints and corresponding strips are placed.

8. The invention of claim 7, wherein said envelope marking step further comprises printing said data directly on said envelope.

9. The invention of claim 7, wherein said envelope marking step comprises printing said data on a self-adhesive label for application to the corresponding envelope.

10. An apparatus for correlating negatives and order envelopes in photographic laboratories, comprising a printing station through which a continuous web of negatives is passed, a finishing station downstream of the printing station, said finishing station comprising means for applying a tab along one edge of said web, and also a first printer for reproducing frame identification data onto said tab, and a microprocessor for controlling said first printer, said microprocessor also being connected to said printing station.

11. The invention of claim 10, further comprising a cutter for severing said web into separate negative strips, said first printer being upstream of said cutter.

12. The invention of claim 10, further comprising, in the finishing station, a second printer, controlled by said microprocessor, for imprinting on said web markings related to those imprinted by the first printer on the tab in positions corresponding with the frames actually printed.

13. The invention of claim 12, wherein said second printer is upstream of the cutter.

14. The invention of claim 12, wherein the second printer is arranged to print on the back of the strip of prints.

15. The invention of claim 10, wherein said finishing station comprises a third printer controlled by the microprocessor for imprinting order identification data on envelopes which are to contain the prints and negative strips of various orders.

16. The invention of claim 15, wherein the third printer is arranged to print directly on the envelopes.

17. An apparatus as claimed in claim 15, wherein the third printer is arranged to print on self-adhesive labels to be automatically applied to the envelopes.

* * * * *

UNITED STATES PATENT AND TRADEMARK OFFICE

CERTIFICATE OF CORRECTION

PATENT NO. : 4,881,090

DATED : November 14, 1989

INVENTOR(S) : Roberto Signoretto

It is certified that error appears in the above-identified patent and that said Letters Patent is hereby corrected as shown below:

In column 3, line 27, please change the first appearance of the word "web" to -- tab --.

Signed and Sealed this

Thirty-first Day of May, 1994

Attest:

BRUCE LEHMAN

*Attesting Officer*

*Commissioner of Patents and Trademarks*